United States Patent [19]

Corley

[11] Patent Number: 4,962,179
[45] Date of Patent: Oct. 9, 1990

[54] EPOXIDIZED FATTY ACID ESTER COMPOSITIONS

[75] Inventor: Larry S. Corley, Houston, Tex.

[73] Assignee: Shell Oil Company, Houston, Tex.

[21] Appl. No.: 401,277

[22] Filed: Aug. 31, 1989

[51] Int. Cl.⁵ .................. C08G 59/32; C08G 59/38
[52] U.S. Cl. ........................... 528/90; 528/92; 528/103; 528/103.5; 528/361
[58] Field of Search ............ 528/361, 103.5, 90, 528/92, 103

[56] References Cited

U.S. PATENT DOCUMENTS

| | | | |
|---|---|---|---|
| 2,949,441 | 8/1960 | Newey | 528/361 |
| 3,035,000 | 5/1962 | Fulmer | 528/361 |
| 3,117,099 | 1/1964 | Proops | 528/361 X |
| 3,138,566 | 6/1964 | Arnold | 528/103.5 X |
| 3,148,199 | 9/1964 | De Groote et al. | 528/361 X |
| 4,284,753 | 4/1981 | Hewitt, Jr. | 528/89 |
| 4,544,732 | 10/1985 | Corley | 528/90 |
| 4,579,931 | 4/1986 | Corley | 528/90 |
| 4,581,436 | 4/1986 | Corley | 528/90 |

OTHER PUBLICATIONS

Handbook of Epoxy Resins, Lee & Neville, pp. 3-9 through 3-12.

*Primary Examiner*—Earl Nielsen

[57] ABSTRACT

A composition is disclosed containing an epoxidized fatty acid ester, an aromatic amine curing agent and an acid or metal salt accelerator. The composition can optionally contain a polyglycidyl ether of a polyhydric alcohol, an unsaturated monomer and a monoepoxy diluent. The composition has long pot life at room temperature and good flexibility and elongation.

29 Claims, No Drawings

EPOXIDIZED FATTY ACID ESTER COMPOSITIONS

BACKGROUND OF THE INVENTION

This invention relates to epoxy resin compositions. In one aspect, the invention relates to heat-curable epoxy compositions having enhanced processability and thermal latency, and very high cured tensile elongation at low cost.

Standard epoxy resins do not have high cured tensile elongation. Some specialty epoxy resins, such as those derived from dimer acid or poly(propyleneoxide) backbones, provide this property, but are relatively expensive. Epoxidized fatty acid esters, being low in cost, would be promising intermediates for making flexible cured resins. However, they have low reactivity with most standard epoxy cured agents, especially amines.

SUMMARY OF THE INVENTION

According to the invention, a composition is provided which comprises (a) an epoxidized fatty acid ester, (b) a curing amount of an aromatic amine, and (c) a catalytic amount of an acidic or metal salt curing accelerator. The composition may optionally include one or more of an additional polyepoxide, an unsaturated monomer, a curing amount of a free-radical curing agent and a monoepoxy diluent. The composition exhibits long pot life at room temperature and provides a cured material having good flexibility and elongation.

DETAILED DESCRIPTION OF THE INVENTION

The epoxidized fatty acid ester component of the invention compositions includes esters of polyhydroxylic alcohols with aliphatic acids containing epoxy groups. The preferred class of these materials is the epoxidized triglycerides prepared by the epoxidation of unsaturated fats of vegetable or animal origin with peroxyacetic acid or a hydroperoxide. These include such materials as epoxidized soybean oil, epoxidized linseed oil, epoxidized tall oil, epoxidized crambe oil, epoxidized lunaria oil, and the like. The epoxide content of these materials will vary with the degree of completion of the epoxidation reaction and also with the amount of unsaturation present in the original oil. For some uses, such as when a particularly low crosslink density and high flexibility in the cured resin product is desired, one may wish to use an epoxidized oil with a low epoxy group content. Such a material may be prepared either by starting with an oil with a low degree of unsaturation or by not carrying the epoxidation reaction to completion.

Esters of unsaturated fatty acids with polyhydroxylic alcohols other than glycerol may be prepared and epoxidized by processes similar to those used to epoxidize the natural unsaturated triglycerides. The products of such reactions would likewise be applicable in this invention. Examples of such materials would include epoxidized polyethylene glycol dioleate, epoxidized polypropylene glycol dioleate, epoxidized pentaerythritol tetraabietate, and the like.

The aromatic amine component of the invention compositions includes any compound in which an amine functionality is attached directly to an aryl ring. Such compounds include methylene dianiline, meta-phenylene diamine, 2,4-bis(p-aminobenzyl)aniline, diaminodiphenyl sulfone, 2,4-toluenediamine, 1,3-diamino-2,4-diethyl-6-methylbenzene, 4,4'-oxydianiline, methylene bis(o-chloroaniline), 2,6-diaminopyridine and 4-bromo-1,3-diaminobenzene. Preferably, the aromatic amine contains no more than one amine group on the same aromatic ring, as cure with an aromatic diamine containing two amine groups on the same ring may compromise strength or cure rate. The amine will generally be present in an amount effective to cure the epoxy constituent(s) of the composition, usually about 0.5 to about 2.0 chemical equivalents, preferably about 0.75 to about 1.25. As used herein, "chemical equivalents" refers to the amount which provides one amino hydrogen per epoxy group.

The invention compositions include an acidic, latent acidic, or metal salt accelerator to accelerate the cure of the epoxy resin by the aromatic amine. Useful accelerators include several classes of compounds known in the art to accelerate aromatic amine cure of epoxy resins. These include, among others, carboxylic acids such as acetic acid, benzoic acid and salicylic acid; phenolic compounds such as phenol, p-nitrophenol, 2,4-dinitrophenol, bisphenol A, o-cresol, resorcinol, and oligomeric condensates of phenolic compounds with aldehydes or ketones; borate esters such as trimethyl borate, tricresyl borate, and trimethoxyboroxine; titanates such as triethanolamine titanate; metal complexes and salts such as stannous octoate; strong acids such as sulfuric acid and p-toluenesulfonic acid; boron trihalide complexes such as boron trifluoride monoethylamine complex and boron trifluoride diethyl etherate; and trihydrocarbyl sulfonium salts containing anions of low nucleophilicity.

The trihydrocarbyl sulfonium salts containing anions of low nucleophilicity are preferred accelerators. Suitable trihydrocarbyl sulfonium salts can be represented by the formula

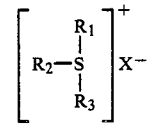

in which $R_1$, $R_2$ and $R_3$ each represent a $C_{1-18}$ alkyl or aryl radical and X is selected from $BF_4^-$, $PF_6^-$, $AsF_6^-$, $SbF_6^-$, $FSO_3^-$, $CF_3SO_3^-$, 2,4,6-trinitrobenzenesulfonate and p-toluenesulfonate. $R_1$, $R_2$ and $R_3$ can contain non-interfering substituents and heteroatoms. Suitable triorganosulfonium salts include triethylsulfonium tetrafluoroborate, methyldiphenylsulfonium tetrafluoroborate, ethyldiphenylsulfonium tetrafluoroborate, allyldimethylsulfonium tetrafluoroborate, allyl bis(2-(allyloxy)ethyl) sulfonium tetrafluoroborate, trimethylsulfonium hexafluorophosphate, and ethyl(2-hydroxyethyl)(2-(ethylthio)ethyl)sulfonium tetrafluoroborate.

Such triorganosulfonium salts can be prepared by processes known in the art. One process involves reaction of a sulfonium halide with the silver salt of a nonnucleophilic anion such as tetrafluoroborate. In a second process, an alcohol such as allyl alcohol, a sulfide such as dimethyl sulfide, and an acid such as tetrafluoroboric acid containing an anion of low nucleophilicity, are mixed and refluxed. In some cases, a thiol may be used instead of a sulfide. Water is removed by azeotropic distillation and entrained in a Dean-Stark trap and the sulfonium salt (in this case, allyldimethylsulfonium tetrafluoroborate) is left in the pot. In a third process, a hydroxylalkyl sulfide, such as 2,2'-thiodiethanol, is mixed with an acid containing an ion of low nucleophilicity and water is removed by vacuum distillation, leaving a sulfonium salt mixture.

In general, a catalytic amount of triorganosulfonium salt is used, usually about 0.001 to about 10, preferably about 0.01 to about 5, most preferably about 0.05 to about 2% by weight, based on the weight of the polyepoxide.

The invention composition may optionally include an additional polyepoxide. The second polyepoxide can be any curable epoxy resin having, on the average, more than one vicinal epoxide group per molecule. The epoxy resin can be saturated or unsaturated, aliphatic, cycloaliphatic, aromatic or heterocyclic, and may bear substituents which do not materially interfere with the curing reaction. They may be monomeric or polymeric.

Suitable epoxy resins include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A are represented below by structure I wherein n is zero or a number greater than 0, commonly in the range of 0 to 10, preferably in the range of 0 to 2.

ene, chlorostyrene, bromostyrene, and nitrostyrene; divinylbenzene; t-butylstyrene; 2-vinylpyridine; and vinylnaphthalene. Styrene and mixtures of styrene and divinylbenzene are preferred.

Suitable unsaturated monocarboxylic acid esters include the alkyl esters of ethylenically unsaturated acids such as acrylic acid, methacrylic acid, crotonic acid, alpha-phenylacrylic acid, alpha-cyclohexylacrylic acid, maleic acid, cyanoacrylic acid, methoxyacrylic acid, and the like. Very preferred acids are acrylic acid and methacrylic acid. Accordingly, suitable such esters include methyl methacrylate, ethyl acrylate, butyl acrylate, butyl methacrylate, isobutyl methacrylate, and the like wherein side chains may contain halogen, e.g., 2,3-dibromopropyl acrylate and pentachlorophenyl methacrylate.

Very preferred comonomers include the polyacrylate and polymethacrylate esters of polyols containing more than one terminal acrylate or methacrylate group. These esters are the acrylic and methacrylic acid esters of aliphatic polyhydric alcohols such as, for example, the di- and polyacrylates and the di- and polymethacrylates of alkylene glycols, polyoxyalkylene glycols, alicyclic glycols and higher polyols, such as ethylene glycol, triethylene glycol, tetraethylene glycol, tetramethylene glycol, hexanediol, trimethylolethane, trimethylolpropane, pentaerythritol, dipentaerythritol,

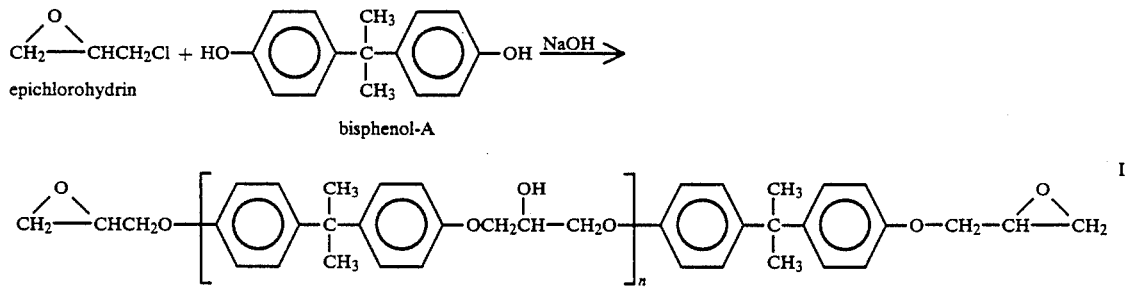

Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of 50 to about 10,000, preferably about 200 to about 1500. The commercially available epoxy resin EPON® Resin 828, a reaction product of epichlorohydrin and 2,2-bis(4-hydroxyphenyl)propane (bisphenol-A) having a molecular weight of about 400, an epoxide equivalent (ASTM D-1652) of about 185-192, and an n value in formula I above of about 0.2, is presently the preferred epoxy resin because of its low viscosity and commercial availability.

The epoxy component(s) of the invention composition are preferably blended with up to about 75% by weight of one or more monomers selected from unsaturated aromatic monomers, esters or amides of ethylenically unsaturated carboxylic acids, cyano-containing compounds, vinyl esters, N-vinyl amides and allyl-containing compounds. Examples of unsaturated aromatic monomers include vinyl aromatic monomers such as styrene, alpha-methyl styrene, and p-methyl styrene; halo- and nitro-substituted styrenes such as vinyl tolutripentaerythritol and the like, or mixtures of these with each other or with their partially esterified analogs.

Typical compounds include but are not limited to trimethylolpropane triacrylate, trimethylolethane triacrylate, trimethylolpropane trimethacrylate, trimethylolethane trimethacrylate, tetramethylene glycol dimethacrylate, ethylene glycol dimethacrylate, triethylene glycol dimethacrylate, pentaerythritol triacrylate. pentaerythritol tetraacylate, 1,6-hexanediol diacrylate, 1,6-hexanediol dimethacrylate, dipentaerythritol tetraacrylate, dipentaerythritol pentaacrylate, and the like. Particularly preferred esters are neopentyl glycol dimethacrylate, trimethylolpropane trimethacrylate, trimethylolpropane triacrylate, pentaerythritol triacrylate, and 1,3-butylene dimethacrylate.

Additional acrylate or methacrylate esters of polyols are the acrylate or methacrylate esters of epoxide resins, wherein epoxide resins as used herein are considered to be polyols. The epoxide resins useful in reacting with acrylic or methacrylic acid are those epoxide resins described hereinbefore. The procedures for preparing these acrylate and methacrylate esters of epoxide resins are described in U.S. Pat. No. 3,377,406.

Suitable unsaturated carboxylic acid amides include acrylamide, N,N'-dimethylacrylamide, diacetone acrylamide, N-isopropylacrylamide, and N,N'-dimethylmethacrylamide, for example.

Suitable cyano-compounds are acrylonitrile, methacrylonitrile and halogenated acrylonitriles, for example.

Suitable vinyl esters include vinyl acetate, vinyl benzoate and divinyl adipate. Suitable N-vinyl amides include N-vinylpyrrolidone, N-vinylacetamide and N,N-divinyladipamide.

Suitable allyl monomers include diallyl phthalate, triallyl isocyanurate, diallyl isophthalate and allyl diglycol carbonate.

The described reactive monomers will be blended with the polyepoxide(s) and monoepoxide (if used) components of the invention composition is an amount within the range of about 1 to about 75, preferably about 5 to about 35, weight percent, based on the combined weight of the epoxides and reactive monomers.

When the invention composition includes a reactive monomer, it also preferably contains a free radical initiator. Examples of such initiators include the peroxides, such as benzoyl peroxide, tertiary butyl hydroperoxide, ditertiary butyl peroxide, hydrogen peroxide, potassium peroxydisulfate, bis(methylcyclohexyl)peroxide, cumene hydroperoxide, acetyl benzoyl peroxide, Tetralin hydroperoxide, phenylcyclohexane hydroperoxide, tertiary butyl peroxyacetate, dicumyl peroxide, tertiary butyl peroxybenzoate, and the like, and mixtures thereof; azo compounds such as 2,2'-azo-bisisobutyronitrile, dimethyl 2,2'-azobisisobutyrate, 2,2'-azobis(2,4-dimethylvaleronitrile), 2,2'-azobisisobutyramide, 2,2'-azobis(2-actetoxypropane), and the like. Particularly preferred initiators include the dialkyl peroxides, tertiary alkyl hydroperoxides, and alkyl esters of peroxycarboxylic acids. Especially useful peroxides include tertiary buryl peroxy(2-ethylhexanoate) and 2,5-bis(tertiary butyl peroxy)-2,5-dimethylhexane. The optimum amount of free-radical initiator can vary over a broad range depending on the amount of the particular unsaturated monomer used, the type of initiator and end-use properties, etc. In general, an effective or curing amount is employed. One skilled in the art would simply adjust the amounts of a particular initiator to suit his process conditions. Such adjustments are made in one or two runs from the known temperatures, half lives, etc.

The invention composition can optimally include a monoepoxy diluent. Examples of monoepoxy diluents include butyl glycidyl ether, phenyl glycidyl ether, cresyl glycidyl ether, t-butylphenyl glycidyl ether, 2,4,6-tribromophenyl glycidyl ether, undecyl glycidyl ether, tetradecyl glycidyl ether, octyl epoxyoleate, propylene oxide, cyclohexene oxide, 1-hexadecene oxide, etc. Compositions containing the nonglycidyl ether epoxy diluents may require longer cure times and higher cure temperatures to develop useful physical properties than do the compositions containing the glycicyl ether epoxy diluents. The monoepoxy diluent, when used, will generally be present in the composition in an amount less than or equal to the total amount of polyepoxides present.

The invention compositions can be prepared by mixing the individual components in any convenient order. Other ingredients which can be included as desired include fillers, reinforcement fibers, pigments, flame retardants, plasticizers, stabilizers, extenders, thixotropic agents, antioxidants and the like.

The invention compositions may be used in many applications, such as for coatings and impregnating compositions in the preparation of adhesives for metals, wood, cement, and the like, in molding powders, fluidized bed powders and potting compounds, and in the preparation of reinforced composite products, such as laminated products, filament windings, sheet molding compounds, and electrical laminates. A very suitable application is in the preparation of reinforced products and laminates wherein the compositions are applied to fibrous products such as glass fibers or cloth and the material formed into the desired object and cured.

The following examples are provided to illustrate the preparation an properties of certain embodiments of the invention compositions. As used in the examples Epoxy Resin A is a liquid glycidyl polyether of 2,2'bis-(4-hydroxyphenyl)propane having an epoxide equivalent weight of 180–195 and an average molecular weight of about 380; Epoxy Resin B is an epoxidized soybean oil having an epoxide equivalent weight of 230–250; Epoxy Resin C is an epoxidized linseed oil having an epoxide equivalent weight of 185–205; and Epoxy Resin D is a mixture of approximately 82% of a glycidyl polyether of 2,2'-bis(4-hydroxyphenyl)propane and 18% of a monoepoxy diluent containing the mixed glycidyl ethers of 1-dodecanol and 1-tridecanol. The mixture has an epoxide equivalent weight of 195–215. The compositions were tested according to the following test procedures:

$T_g$, ° C., Dynamic Mechanical (Rheometrics)
R.T. Tensile Strength, MPa, ASTM D-638
R.T. Tensile Modulus, MPa, ASTM D-638
R.T. Tensile Elongation, %, ASTM D-638
149° C. Tensile Strength, MPa, ASTM D-638
149° C. Tensile Modulus, MPa, ASTM D-638
149° C. Tensile Elongation, %, ASTM D-638

EXAMPLE 1

Reaction of 2-(Ethylthio)ethanol with 48% Aqueous HBF$_4$ 2-(Ethylthio)ethanol (6372 grams, 60 moles) was mixed with 5487 grams (30 equivalents) of 48% aqueous tetrafluoroboric acid. This mixture was held in a 5-gallon polyethylene reservoir. A glass wiped-film evaporator with an evaporative surface area of 323 cm$^2$ was set up with a Teflon intake tube leading to the polyethylene reservoir; intake rate was controlled by a metering valve. The evaporative surface was held at a temperature of 95°–98° C. while water was pumped from an ice bath to cool the condensation surface. The pressure in the evaporator was lowered to 40–130 Pa and the mixture of 2-(ethylthio)ethanol and tetrafluoroboric acid was introduced slowly. Water was evaporated from the mixture leaving the desired reaction product as the residue. The feed intake rate was regulated to give a product output rate of 5 to 15 mL/min. Karl Fischer titration showed a water level of 2.5% in the product. Plasma emission spectrometry showed boron levels of 4.2 and 4.3 weight percent in the product in duplicate analyses. The $^{13}$C NMR spectrum of the product (I) in acetone-d$_6$ was consistent with a structure of

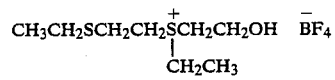

(ethyl(2-hydroxyethyl) (2-ethylthio)ethyl) sulfonium tetrafluoroborate) for 72% of the product, with the product (I) apparently containing 2% of 2-(ethylthio)e- thanol and 26% of other components of unknown structure.

EXAMPLE 2

Reaction of 2,2-Thiodiethanol with 48% Aqueous HBF$_4$

A mixture of 2,2-thiodiethanol (98.5%) (6200 grams, 50 moles) with 4580 grams (25 Eq) of 48% aqueous tetrafluoroboric acid was prepared and held in a 5-gallon polyethylene reservoir. A glass wiped-film evaporator was set up under evaporation conditions identical to those in Example 1. The thiodiethanol-tetrafluoroboric acid mixture was introduced into the wiped-film evaporator at a rate sufficient to give a product output rate of 10 to 12 mL/min. Karl Fischer titration of the product (II) of this reaction (a sulfonium salt mixture) showed a water concentration of 2.5%.

EXAMPLE 3

Effect of Different Accelerators in Cure of Epoxidized Vegetable Oils and Their Mixtures with Glycidyl Ether Epoxy Resins Using Methylenedianiline as the Curing Agent A portion of Upjohn Curithane 116 (a technical grade of methylenedianiline) was melted and then allowed to cool to room temperature, at which temperature it remained a supercooled liquid. The liquid Curithane 116 was combined with Epoxy Resins A, B, and C and accelerators (in the proportions listed in Table 1) in polyethylene beakers and then mixed thoroughly with Jiffy mixers. The mixtures were then degassed by centrifuging and later placed under vacuum to complete the degassing. Gel times at various temperatures (in thin films on gel plates) were determined for each of the mixtures shortly after mixing. Portions of some of the mixtures were poured into Ubbelohde viscometers which were placed into a water bath held at 25° C. Kinematic viscosity of the mixtures was determined as a function of time. A "pot life" was determined for some of the mixtures as the extrapolated time required for the initial kinematic viscosity to double.

A portion of each mixture was poured into a mold made of two glass plates held ⅛" (3.2 mm) apart with a polytetrafluoroethylene spacer to make a sheet casting. The molds were placed into an oven and the mixtures were cured by the cure cycle given in Table 1. The sheet castings were then removed from the molds and tested for mechanical properties. Mechanical properties are given in Table 1.

A number of salient points are evident from the data in Table 1. First, one can see that all but one (16512-146-5) of the mixtures which contained epoxidized vegetable oils and were cured without accelerator yielded castings which were mechanically incoherent. (The exception was a casting prepared from epoxidized linseed oil, which has a high epoxide content.) Even that system required over one hour to gel at 180° C., cure kinetics which are unreasonably sluggish for most applications.

The mixtures which contained epoxidized soybean oil unmodified with glycidyl ethers did not give coherent castings when accelerated with salicylic acid or stannous octoate, two "standard" accelerators for aromatic amine cure epoxies. In contrast, boron trifluoride ethylamine complex did accelerate the aromatic amine cure of epoxidized soybean oil to give rubbery castings with excellent elongation. The product of Example 1 (I) accelerated the aromatic amine cure of epoxidized soybean oil to give similarly good castings and was a more latent accelerator than the boron trifluoride ethylamine complex, with gel time showing greater variation with temperature. The 25° C. pot life of the mixtures accelerated with I was longer than that of the mixtures accelerated with boron trifluoride ethylamine complex at equivalent 150° C. gel time.

TABLE 1

CURE OF EPOXIDIZED VEGETABLE OILS AND THEIR MIXTURES WITH GLYCIDYL ETHER EPOXY RESINS BY ACCELERATED AND UNACCELERATED AROMATIC AMINES (a)

| Run # | Epoxy Resin A, parts | Epoxy Resin B, parts | Epoxy Resin C, parts | Curithane 116, parts | Accelerator (parts) (b) | 120° C. Gel Time, sec. | 150° C. Gel Time, sec. | 180° C. Gel Time, sec. |
|---|---|---|---|---|---|---|---|---|
| 1 | 50 | 50 | | 25.09 | | | 800 | 320 |
| 2 | 50 | 50 | | 25.09 | SA(1) | 320 | 175 | 78 |
| 3 | 50 | 50 | | 25.09 | SO(2) | 260 | 130 | 65 |
| 4 | 50 | 50 | | 25.09 | I(1) | 550 | 140 | 45 |
| 5 | | 100 | | 22.12 | | | | >1000 |
| 6 | | 100 | | 22.12 | SA(1) | | | >4000 |
| 7 | | 100 | | 22.12 | SO(2) | | | 1125 |
| 8 | | 100 | | 22.12 | BFE(0.32) | | 1350 | 350 |
| 9 | | 100 | | 22.12 | BFE(0.63) | | 630 | 160 |
| 10 | | 100 | | 22.12 | BFE(1.26) | >1000 | 310 | 115 |
| 11 | | 100 | | 22.12 | I(1) | | 1025 | 140 |
| 12 | | 100 | | 22.12 | I(2) | | 490 | 85 |
| 13 | | 100 | | 22.12 | I(4) | ~1200 | 320 | 45 |
| 14 | | | 100 | 26.88 | | | | >3800 |
| 15 | | | 100 | 26.88 | I(1) | | ~1000 | 210 |

| Run # | Elapsed Time (min.)-Ubbelohde Kinematic Viscosity (mm$^2$/sec) (25° C.) (ASTM D-445) | 25° C. Pot Life, hr. (c) | Rheometrics $T_g$, °C. (tan delta peak) | R.T. Tensile Strength, MPa (ASTM D-638) | R.T. Tensile Modulus, MPa (ASTM D-638) | R.T. Tensile Elongation, % (ASTM D-638) |
|---|---|---|---|---|---|---|
| 1 | | | (d) | | | |
| 2 | | | 95 | 43.1 | 1710 | 8.2 |
| 3 | | | 107 | 41.2 | 1660 | 7.7 |
| 4 | | | 105 | 48.9 | 1890 | 12.2 |

TABLE 1-continued
CURE OF EPOXIDIZED VEGETABLE OILS AND THEIR MIXTURES WITH GLYCIDYL ETHER EPOXY RESINS BY ACCELERATED AND UNACCELERATED AROMATIC AMINES (a)

| | | | | | | |
|---|---|---|---|---|---|---|
| 5 | 175–745, 270–746 360–746, 430–747 | >>25 | (d) | | | |
| 6 | | | (d) | | | |
| 7 | | | (d) | | | |
| 8 | 100–735, 225–752, 300–753, 355–755 | >25 | 31 | 8.4 | 6.2 | 150.8 |
| 9 | 98–567, 223–672, 298–717, 353–748 | 14 | 31 | 12.2 | 10.9 | 156.5 |
| 10 | 95–608, 220–697, 295–735, 350–766 | 12.5 | 32 | 11.6 | 7.2 | 163.7 |
| 11 | 165–733, 265–740, 355–747, 430–748 | >25 | 32 | 10.4 | 50.4 | 118.6 |
| 12 | 163–705, 268–714, 358–740, 428–749 | >25 | 31 | 6.8 | 8.9 | 92.7 |
| 13 | 160–688, 265–715, 350–746, 425–787 | 22 | 27 | 4.1 | 7.2 | 67.6 |
| 14 | | | 37 | 6.2 | 3.8 | 164.3 |
| 15 | | | 50 | 25.9 | 943 | 45.1 |

(a) Cure cycle: 1 hour at 80° C., 1 hour at 120° C., 1 hour at 150° C., 4 hours at 175° C.
(b) SA = salicyclic acid; SO = stannous octoate; BFE = CH$_3$CH$_2$NH$_2$.BF$_3$ (used as masterbatch of 2 parts BFE in 35 parts Curithane 116); I = product of Example 1.
(c) Time for Ubbelohde kinematic viscosity of mixture to double from extrapolated initial value.
(d) Castings were incoherent, with no structural integrity; hence mechanical properties could not be determined.

EXAMPLE 4

Epoxidized Vegetable Oils and Mixtures of Epoxidized Vegetable Oils and Glycidyl Ether Epoxy Resins Cured With Aromatic Amines Modified With Styrene and Acrylic Monomers Nineteen parts (by weight) of Upjohn Curitthane 116 and 9 parts of du Pont BABA (a technical grade of 2,4-bis(p-aminobenzyl)aniline) were melted and combined in a vessel. The mixture was held for one hour at 135° C. with vigorous stirring to melt any crystals or other solid material present. The mixture was then cooled to 80° C. and 10 parts of trimethylolpropane trimethacrylate (TMPTMA) and 0.01 part of hydroquinone were added. Stirring was continued until the mixtures was homogeneous. This mixture was used as the "Curing Agent Mixture" in this and all following examples.

The above curing agent mixture was combined in polyethylene beakers with Epoxy Resins A, B and C, styrene, and Lupersol 101 (2,5-bis(t-butylperoxy)-2,5-dimethylhexane, a free-radical initiator) in the proportions listed in Table 2. The mixtures were then mixed thoroughly with Jiffy mixers as in Example 3. The mixtures were then degassed by centrifuging and later placed under vacuum to complete the degassing. Gel times at various temperatures (in thin films on gel plates) were determined for some of the mixtures shortly after mixing. Portions of some of the mixtures were poured into Ubbelohde viscometers which were placed into a water bath held at 25° C. Kinematic viscosity of the mixtures was determined as a function of time. A "pot life" was determined for some of the mixtures as the extrapolated time required for the initial kinematic viscosity to double.

Portions of some of the mixtures were poured into molds made of two glass plates held ⅛" (3.2 mm) apart with polytetrafluoroethylene spacers to make sheet castings. The molds were placed into an oven and the mixtures were cured by the cure cycle given in Table 2. The sheet castings were then removed from the molds and tested for mechanical properties. Mechanical properties are given in Table 2.

One can see from Table 2 that the monomer-diluted mixtures behaved similarly to the mixtures from Table 1 with no monomers except that the monomer-diluted mixtures were, of course, lower in viscosity. Most of the castings cured without accelerators, and all of the castings made with large fractions of epoxidized vegetable oils and cured without accelerators, were too weak for mechanical testing. Both the product of Example 1 and the product of Example 2 enabled the formulations to cure nicely to castings ranging from hard to elastomeric depending on the relative proportions used of glycidyl ether epoxy resin and epoxidized vegetable oil. The range of properties obtainable was similar to that in Example 3.

TABLE 2
CURE OF MONOMER-DILUTED EPOXIDIZED VEGETABLE OILS AND THEIR MIXTURES WITH GLYCIDYL ETHER EPOXY RESINS BY ACCELERATED AND UNACCELERATED AROMATIC AMINES (a)

| Run # | Epoxy Resin A, parts | Epoxy Resin B, parts | Epoxy Resin C, parts | Styrene, parts (b) | Curing Agent Mixture, parts | Accelerator (parts) (c) | 120° C. Gel Time, sec. | 150° C. Gel Time, sec. | 180° C. Gel Time, sec. |
|---|---|---|---|---|---|---|---|---|---|
| 16 | 100 | | | 12 | 38 | | | 560 | 130 |
| 17 | 100 | | | 12 | 38 | II(1) | 275 | 70 | 14 |
| 18 | 75 | 25 | | 9 | 36 | | | 700 | 190 |
| 19 | 75 | 25 | | 9 | 36 | II(1) | 650 | 165 | 42 |
| 20 | 75 | | 25 | 9 | 37.6 | | | 610 | 185 |
| 21 | 75 | | 25 | 9 | 37.6 | II(1) | 700 | 220 | 52 |
| 22 | 50 | 50 | | 6 | 34 | | | 745 | 220 |
| 23 | 50 | 50 | | 6 | 34 | II(1) | 660 | 200 | 56 |

TABLE 2-continued

CURE OF MONOMER-DILUTED EPOXIDIZED VEGETABLE OILS AND THEIR MIXTURES WITH GLYCIDYL ETHER EPOXY RESINS BY ACCELERATED AND UNACCELERATED AROMATIC AMINES (a)

| Run # | | | | | | Accel. | | | |
|---|---|---|---|---|---|---|---|---|---|
| 24 | 50 | | 50 | 6 | 37.2 | | | 825 | 260 |
| 25 | 50 | | 50 | 6 | 37.2 | II(1) | ~1000 | 430 | 95 |
| 26 | 25 | 75 | | 3 | 32 | | | ~2000 | 600 |
| 27 | 25 | 75 | | 3 | 32 | II(1) | >1500 | 525 | 105 |
| 28 | 25 | | 75 | 3 | 36.8 | | | ~2000 | 700 |
| 29 | 25 | | 75 | 3 | 36.8 | II(1) | >1500 | 650 | 130 |
| 30 | 20 | 80 | | 2.4 | 31.6 | II(1) | ~1000 | 540 | 100 |
| 31 | 10 | 90 | | 1.2 | 30.8 | II(1) | >1500 | >1000 | 520 |
| 32 | | 100 | | 10 | 30 | | | | >5000 |
| 33 | | 100 | | 10 | 30 | II(1) | | 660 | 117 |
| 34 | | 100 | | | 30 | II(1) | ~3000 | 550 | 100 |
| 35 | | 100 | | | 30 | II(1) | >1500 | | 350 |
| 36 | | 100 | | | 30 | I(1) | | 450 | 125 |
| 37 | | 100 | | | 30 | II(2) | >1500 | 425 | 125 |
| 38 | | 100 | | | 30 | I(2) | 1050 | 320 | 98 |
| 39 | | 100 | | | 30 | II(4) | 875 | 185 | 54 |
| 40 | | 100 | | | 30 | I(4) | 570 | 182 | 50 |
| 41 | | | 100 | 10 | 36.4 | | | | |
| 42 | | | 100 | 10 | 36.4 | II(1) | | 1400 | 220 |
| 43 | | | 100 | | 36.4 | II(1) | | | |

| Run # | Elapsed Time (min.)- Ubbelohde Kinematic Viscosity (mm²/sec) (25° C.) (ASTM D-445) | 25° C. Pot Life, hr. (d) | Rheometrics $T_g$, °C (tan delta peak) | R.T. Tensile Strength, MPa (ASTM D-638) | R.T. Tensile Modulus, MPa (ASTM D-638) | R.T. Tensile Elongation, % (ASTM D-638) |
|---|---|---|---|---|---|---|
| 16 | | | 178 | 79.3 | 2890 | 5.4 |
| 17 | | | 144 | 51.3 | 2140 | 5.3 |
| 18 | | | 146 | 65.9 | 2520 | 4.8 |
| 19 | | | (e) | | | |
| 20 | | | 146 | 64.2 | 2660 | 3.8 |
| 21 | | | (e) | | | |
| 22 | 125–961, 185–998, 285–1116, 440–1321 | 10 | 115 | 48.6 | 1880 | 11.0 |
| 23 | | | | | | |
| 24 | | | (e) | | | |
| 25 | 120–3132, 180–3287, 285–3698, 435–4708 | 9 | 122 | 54.5 | 2100 | 6.5 |
| 26 | | | (e) | | | |
| 27 | | | 60 | 29.8 | 1460 | 34.4 |
| 28 | | | (e) | | | |
| 29 | | | 84 | 44.8 | 2050 | 11.5 |
| 30 | 165–613, 270–728, 355–801, 415–863 | 8.5 | 57 | 27.3 | 1240 | 35.4 |
| 31 | 170–756, 275–769, 360–787, 420–806 | >20 | 37 | 15.1 | 200 | 76.1 |
| 32 | | | (e) | | | |
| 33 | 85–216, 180–218, 300–220, 435–220 | >>20 | (f) | | | |
| 34 | 117–690, 177–693, 287–696, 432–696 | >>20 | 30 | 7.5 | 12 | 102 |
| 35 | | | | | | |
| 36 | | | | | | |
| 37 | | | | | | |
| 38 | | | | | | |
| 39 | | | | | | |
| 40 | | | | | | |
| 41 | | | (e) | | | |
| 42 | 80–389, 175–399, 295–417, 430–477 | >14 | 52 | 26.3 | 1365 | 34.1 |
| 43 | | | 52 | 21.5 | 932 | 46.3 |

(a) All mixtures contained 0.4 parts Lupersol 101. Cure cycle: 1 hour at 80° C., 1 hour at 120° C., 1 hour at 150° C., 4 hours at 175° C.
(b) The styrene used contained 1000 ppm phenothiazine.
(c) I = product of Example 1; II = product of Example 2.
(d) Time for Ubbelohde kinematic viscosity of mixture to double from extrapolated initial value.
(e) Casting was incoherent, with no structrual integrity; hence mechanical properties could not be determined.
(f) Casting was not tested because of high void content.

EXAMPLE 5

Use of Epoxidized Vegetable Oils in Aromatic Amine Cured Formulations Containing Monoepoxy Diluents Epoxy Resins A, B and D, Azepoxy 8 (a monoepoxy diluent composed primarily of the mixed glycidyl ethers of 1-dodecanol and 1-tridecanol), the curing agent mixture from Example 4, the accelerator from Example 2, and t-butylperoxy(2-ethylhexanoate) (a free-radical initiator effective at relatively low curing temperatures) were combined, in the proportions listed in Table 3, in polyethylene beakers and mixed with Jiffy mixers as in Example 3.

The mixtures were then degassed by centrifuging and later placed under vacuum to complete the degassing. Gel times at various temperatures (in thin films on gel plates) were determined for each mixture shortly after mixing. Portions of some of the mixtures were poured into Ubbelohde viscometers which were placed into a water bath held at 25° C. Kinematic viscosity of the mixtures was determined as a function of time. A "pot life" was determined for some of the mixtures as the extrapolated time required for the initial kinematic viscosity to double.

A portion of each mixture was poured into a mold made of two glass plates held ⅛" (3.2 mm) apart with a polytetrafluoroethylene spacer to make a sheet casting. The molds were placed into an oven and the mixtures were cured for 10 hours at 80° C. The sheet castings were then removed from the molds and tested for mechanical properties. Mechanical properties are given in odorous styrene (Table 2). Use of the low-temperature radical initiator to polymerize the trimethylolpropane trimethacrylate contained in the amine mixture enables cure of the system at 80° C. without degradation of properties by substantial amounts of unpolymerized monomer.

The properties of the epoxy systems in this example varied with the ratio of glycidyl ether epoxy resin to epoxidized vegetable oil in much the same way as in Examples 3 and 4. Other epoxy systems, such as those cured by aliphatic amines, amidoamines, or polyamides also cure at low temperature to give products with good strength and elongation. These curing agents, however, give a pot life which is far inferior to that provided by the compositions in this example.

TABLE 3

EPOXIDIZED VEGETABLE OILS AND THEIR MIXTURES WITH GLYCIDYL ETHER EPOXY RESINS AND MONOEPOXY DILUENTS, CURED WITH ACCELERATED MONOMER-DILUTED AROMATIC AMINES (a)

| Run # | Epoxy Resin A, parts | Epoxy Resin B, parts | Epoxy Resin D, parts | Azepoxy 8, parts | Curing Agent Mixture, parts | Accelerator I, parts (b) | 120° C. Gel Time, sec. | 150° C. Gel Time, sec. | 180° C. Gel Time, sec. |
|---|---|---|---|---|---|---|---|---|---|
| 44 | 88 | | | 12 | 36.4 | | | 520 | 165 |
| 45 | | | 100 | | 35 | | | 725 | 245 |
| 46 | 88 | | | 12 | 36.4 | 1 | 300 | 72 | 17 |
| 47 | | | 100 | | 35 | 1 | 290 | 72 | 25 |
| 48 | | 12.5 | 87.5 | | 34.4 | 1 | 375 | 95 | 28 |
| 49 | 67.5 | 25 | | 7.5 | 35 | 1 | 450 | 140 | 28 |
| 50 | | 25 | 75 | | 33.8 | 1 | 485 | 130 | 45 |
| 51 | 67.5 | 25 | | 7.5 | 35 | 2 | 235 | 55 | 19 |
| 52 | 46 | 50 | | 4 | 33.5 | 1 | 780 | 235 | 48 |
| 53 | 46 | 50 | | 4 | 33.5 | 2 | 440 | 115 | 28 |
| 54 | 46 | 50 | | 4 | 33.5 | 4 | 410 | 95 | 26 |
| 55 | | 50 | 50 | | 32.5 | 1 | ~1000 | 225 | 68 |

| Run # | Elapsed Time (min.)- Ubbelohde Kinematic Viscosity (mm²/sec) (25° C.) (ASTM D-445) | 25° C. Pot Life, hr. (c) | Rheometrics $T_g$, °C. (tan delta peak) | R.T. Tensile Strength, MPa (ASTM D-638) | R.T. Tensile Modulus, MPa (ASTM D-638) | R.T. Tensile Elongation, % (ASTM D-638) |
|---|---|---|---|---|---|---|
| 44 | 205–3555, 280–3593, 350–3647, 450–4056 | >12 | | (d) | | |
| 45 | 175–1274, 285–1391, 355–1463, 425–1545 | 15 | 100 | 63.4 | 2710 | 7.2 |
| 46 | 203–3518, 278–4078, 348–4812, 448–6441 | 4.7 | | (d) | | |
| 47 | 173–1534, 278–1720, 353–2035, 418–2230 | 7.5 | 103 | 75.1 | 2870 | 7.4 |
| 48 | | | 100 | 60.9 | 2410 | 6.9 |
| 49 | 305–3003, 350–3206, 445–3830 | 7 | | 53.0 | 2170 | 10.0 |
| 50 | 170–1220, 275–1376, 350–1606, 415–1858 | 7.5 | 82 | 38.8 | 1770 | 18.3 |
| 51 | 185–1541, 305–2590, 375–3410, 445–4797 | 2.7 | | 55.9 | 2440 | 8.0 |
| 52 | 180–1179, 300–1522, 370–1705, 440–2632 | 6.7 | | 15.1 | 750 | 16.2 |
| 53 | 188–1146, 298–1495, 368–1821, 438–2255 | ~6 | | 15.6 | 670 | 14.0 |
| 54 | 185–1476, 300–1731, 370–1929, 440–2277 | 6.2 | | 17.7 | 640 | 30.5 |
| 55 | 168–983, 278–1096, 353–1186, 413–1261 | 12.5 | 52 | 10.3 | 129 | 63.6 |

(a) All mixtures contained 0.2 parts t-butylperoxy(2-ethylhexanoate). Cure cycle: 10 hours at 80° C.
(b) Product of Example 1.
(c) Time for Ubbelohde kinematic viscosity of mixture to double from extrapolated initial value.
(d) Casting was not tested because of high void content.

Table 3.

A number of salient points can be seen from Table 3. First, the use of the low-volatility monoepoxy diluent in these systems provides a combination of room-temperture tensile strength, modulus, and elongation which is equal to or better than that of the undiluted systems (Table 1) or the systems diluted with relatively volatile,

I claim:
1. A composition comprising:
   (a) an epoxidized fatty acid ester;
   (b) a curing amount of an aromatic amine; and
   (c) a catalytic amount of an acidic or metal salt curing accelerator.

2. The composition of claim 1 in which the curing accelerator is selected from the group consisting of carboxylic acids, Lewis acid complexes and metal salts thereof.

3. The composition of claim 2 in which the epoxidized fatty acid ester is an epoxidized vegetable oil.

4. The composition of claim 3 in which the epoxidized vegetable oil is epoxidized soybean oil.

5. The composition of claim 3 in which the epoxidized vegetable oil is epoxidized linseed oil.

6. The composition of claim 2 in which the aromatic amine is selected from the group consisting of methylene dianiline, 2,4-bis(p-aminobenzyl)aniline, and mixtures thereof.

7. The composition of claim 1 in which the curing accelerator is salicylic acid.

8. The composition of claim 1 in which the curing accelerator is a Lewis acid complex.

9. The composition of claim 8 in which the Lewis acid complex is boron trifluoride ethylamine complex.

10. The composition of claim 1 in which the curing accelerator is a metal salt.

11. The composition of claim 10 in which the metal salt is stannous octoate.

12. The composition of claim 1 in which the curing accelerator is a trihydrocarbyl sulfonium salt.

13. The composition of claim 12 in which the trihydrocarbyl sulfonium salt is a trialkyl sulfonium salt.

14. The composition of claim 13 in which the trialkyl sulfonium salt is ethyl(2-hydroxyethyl) (2-(ethylthio)ethyl) sulfonium tetrafluoroborate.

15. The composition of claim 13 in which the trialkyl sulfonium salt is a mixed condensation reaction product of 2,2'-thiodiethanol with tetrafluoroboric acid.

16. The composition of claim 1 in which the aromatic amine is present in an amount within the range of about 0.5 to about 1.5 equivalents, based on epoxide groups present in the composition.

17. The composition of claim 16 in which the curing accelerator is present in the composition in an amount within the range of about 0.001 to about 10 weight percent, based on the weight of any epoxy components of the composition.

18. The composition of claim 1 which further comprises from about 1 to about 75 weight percent, based on the weight of all epoxy components present, of an unsaturated monomer selected from the group consisting of vinyl aromatic monomers, alkyl esters of ethylenically unsaturated monocarboxylic acids, alkyl amides of ethylenically unsaturated monocarboxylic acids, cyano group-containing compounds, vinyl esters, N-vinyl amides and allyl group-containing compounds.

19. The composition of claim 18 in which the unsaturated monomer is a vinyl aromatic monomer.

20. The composition of claim 19 in which the vinyl aromatic monomer is styrene.

21. The composition of claim 18 in which the unsaturated monomer is an ester of an ethylenically unsaturated acid.

22. The composition of claim 21 in which the ester of an ethylenically unsaturated acid is a poly(meth)acrylate ester of a polyol.

23. The composition of claim 22 in which the poly(meth)acrylate ester of a polyol is trimethylolpropane trimethacrylate.

24. The composition of claim 18 which further comprises a curing amount of a free radical curing agent.

25. The composition of claim 24 in which the peroxide is selected from the group consisting of 2,5-bis(t-butylperoxy)-2,5-dimethylhexane and t-butylperoxy(2-ethylhexanoate).

26. The composition of claim 1 which further comprises from about 1 to about 400 weight percent, based on the weight of component (a), of a polyglycidyl ether of a polyhydric alcohol.

27. The composition of claim 26 in which the polyglycidyl ether of a polyhydric alcohol is a diglycidyl ether of bisphenol-A.

28. The composition of claim 1 which further comprises from about 1 to about 50 weight percent, based on the weight of the composition, of a monoepoxy diluent.

29. The composition of claim 28 in which the monoepoxy diluent is selected from the group consisting of glycidyl ethers of 1-dodecanol, 1-tridecanol and mixtures thereof.

* * * * *